Sept. 14, 1948.  H. R. ABBRECHT  2,449,042
TRIMMING MACHINE
Filed Aug. 14, 1944

INVENTOR.
HERMANN R. ABBRECHT
BY
Oberlin, Limbach & Day
ATTORNEYS

Patented Sept. 14, 1948

2,449,042

UNITED STATES PATENT OFFICE 2,449,042

TRIMMING MACHINE

Hermann R. Abbrecht, Shaker Heights, Ohio, assignor to The Osborn Manufacturing Company, Cleveland, Ohio, a corporation of Ohio Application August 14, 1944, Serial No. 549,363

1 Claim. (Cl. 56—249)

The present improvements, relating as indicated to trimming machines, have more particular regard, although they are not necessarily limited, to machines for trimming lawns, hedges, or like vegetable growth. Still more particularly the invention has to do with the improvement of lawn mowers and like trimming machines in which a rotary cutter, cooperating with a stationary cutter bar, is employed.

Heretofore in machines of the type in question both the rotary cutter blades and the stationary cutter bar have had to be formed with coacting cutting edges which not only have to be kept quite sharp, in order to secure efficient operation, but also maintained in close coacting relation. I have now discovered that the rigid cutting blades conventionally used in the rotary member of a machine of the type described may be replaced with elongated brush members mounted for operation in the same manner as such blades, i. e. so as to coact with a relatively stationary cutting bar, with resulting striking improvement not only in the efficiency of operation but in eliminating the necessity for close adjustment of the two cutting elements and the recurring necessity for sharpening the same. At the same time I have found such improved construction results in more quiet operation as well as greater ease of operation.

To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

Figure 1:
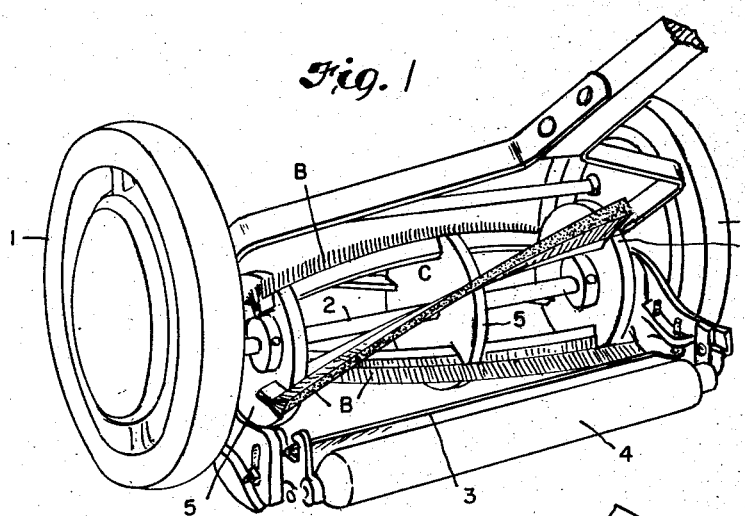
Fig. 1 is a perspective view of a lawn mower which in general is of conventional design, but has incorporated therein my improved construction of rotary cutter.
Figure 3:
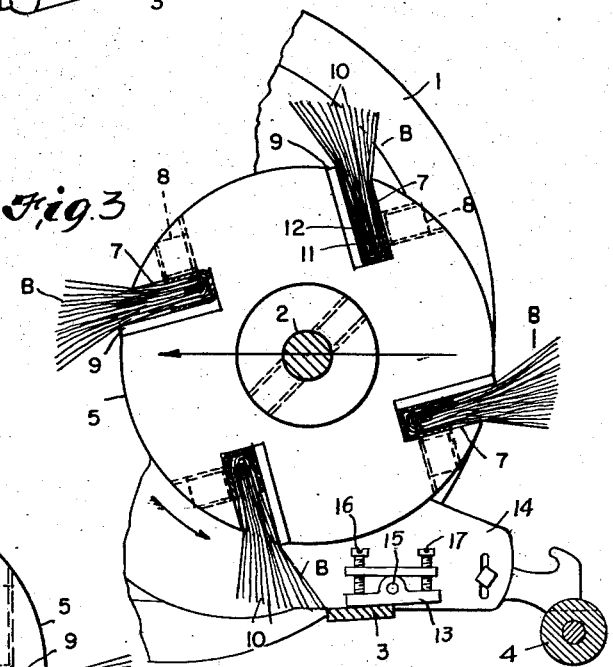
Fig. 3 is a view similar to Fig. 2 but showing a modification in the manner in which such brush elements are mounted.

The lawn mower perspectively shown in Fig. 1 for the purpose of illustrating one adaptation of my invention is of the hand operated type and is in the main of familiar construction. Thus the wheels 1 which support the machine as it is moved about also constitute the drive means for operating the rotary cutter C which is carried on a transverse shaft 2 extending between said wheels and cooperates with a relatively stationary cutter bar 3. Such cutter bar may, if desired, be mounted as shown in Fig. 3 to permit of adjustment. The respective ends of the bar 3 are supported by brackets such as 13 pivoted on frame 14 at 15. Adjusting screws 16 and 17 hold such brackets and the cutter bar in selected position. A standard form of gearing whereby the rotor may be driven by means of the supporting wheels is illustrated in Patent No. 1,439,832 to Merrill.

In addition to shaft 2, the rotary cutter comprises a series (three as shown) of spaced supporting discs 5 for the cutting elements proper. These discs are peripherally formed with a plurality of slots corresponding with the number of cutting elements utilized, such slots being preferably disposed so as to extend either in a general radial direction, as in the case of the slots 6 in Fig. 2, or at a slight angle to radially drawn lines, as illustrated in the case of the slots 7 in Fig. 3. The elongated brush elements B, which will be presently described, are designed to be clamped in these slots by means of set screws 8 and clamping plates 9, it being noted that the slots in the successive discs 5 are not in alignment but are so located that the brush element when seated therein will be helically disposed about the shaft 2 which defines the axis of the rotary cutter as a whole.

Figure 2:
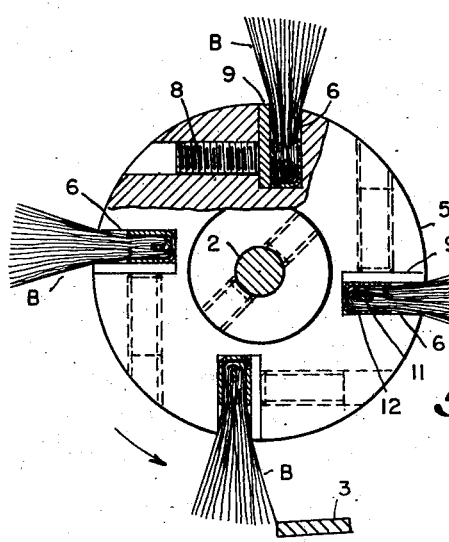
Fig. 2 is a transverse section through such rotary cutter, taken on a plane intermediate of its ends, showing one disposition of the elongated brush elements which, as stated, replace the conventional rigid cutter bars or knives.

As best shown in Figs. 2 and 3, the brush elements B which thus take the place of the conventional rigid cutter bars or knives are of the form known in brush manufacture as "brush strip." Thus each such element comprises a layer of stranded brush material 10 which is doubled about a longitudinally extending wire 11 or equivalent retaining member, and such doubled portion then seated in a channel base 12. Depending upon the character of the particular trimming or cutting operation in which the machine is intended to be employed, the stranded brush material may consist of wire, vegetable fiber, such as tampico, synthetic fibers, or any of the stranded materials used in making brush strip, or a mixture of such materials.

Either before or after the brush strips which thus constitute the cutting elements of the rotary cutter are secured in place, the projecting ends of the brush material, i. e. the outer faces of the elements, will be trimmed to project substantially the same radial distance from the center of the rotary cutter as a whole. In the assembled machine the stationary cutter bar 3 will then be adjusted so as to closely contact the faces of the brush elements as thus contoured. In operation, as viewed in Figs. 2 and 3, the rotary cutter carrying the aforesaid brush elements will be driven in a counterclockwise direction as the machine as a whole is moved across the grass or other material which is to be trimmed or cut. Such grass will thus be caught between stationary bar 3 and the successive helically disposed brush elements of the rotary cutter in much the same manner as between such bar and the knives of the rotary cutter in the conventional lawn mower. The stranded material composing the brush elements I have found has an effective severing action on grass and other plant growth equal or superior to that of a rigid bar or knife, and, without requiring the nicety of adjustment where such rigid knife is employed, uniform trimming throughout the full length of the stationary cutter bar is readily obtained. At the same time small objects such as stones, twigs, and the like, which interfere with the cutting operation where rigid bars or knives are employed in the rotary cutter, will be carried by such brush elements across the stationary bar without any detrimental results. In fact such brush elements serve the dual function of acting as an element of the rotary cutter and as a rotary sweeper so that where the usual basket or container is attached to the mowing machine not only will the severed grass and other plant growth be collected, but also the other objects referred to.

Figure 4:
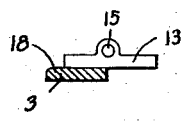
Fig. 4 is a detail view showing one commonly employed means for adjustably supporting the cutter bar.

The cutting action of the stranded brush material as it sweeps across the stationary cutter bar 3 is not particularly dependent upon the latter having a sharp opposed edge. In fact, the coacting edge 18 may be somewhat rounded (Fig. 4) and satisfactory cutting action still obtained. By the same token, there will be no necessity for sharpening such bar, for as the ends of the stranded brush material which compose the rotary cutting elements wear away, the cutting effect may be fully restored by simply adjusting such relatively stationary bar so as to contact a little more closely with the brush elements as they rotate.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:

In a trimming machine, the combination of an elongated cutter bar and a plurality of brush strips mounted for rotation about a common axis parallel with said bar, said strips having faces of substantial width disposed to pass in close shearing contact with the cutting edge of said bar upon being rotated and to cooperate therewith in cutting engagement, said faces being helically disposed in relation to such axis.

HERMANN R. ABBRECHT.

REFERENCES CITED

The following references are of record in the file of this patent:

UNITED STATES PATENTS

| Number | Name | Date |
|---|---|---|
| 425,695 | Pontious | Apr. 15, 1890 |
| 426,882 | Thompson | Apr. 29, 1890 |
| 998,517 | Humm | July 18, 1911 |
| 1,071,554 | Jackson | Aug. 26, 1913 |
| 1,439,832 | Merrill | Dec. 26, 1922 |
| 1,836,386 | Nichols et al. | Dec. 15, 1931 |
| 2,056,369 | Roessel | Oct. 6, 1936 |